United States Patent [19]
Liu et al.

[11] Patent Number: 5,518,030
[45] Date of Patent: May 21, 1996

[54] THREE-WAY FLOW VALVE WITH VARIABLE DRAIN ORIFICE AREA

[75] Inventors: Chung Y. Liu; Benjamin M. Yen; Lester L. Peters; Julius P. Perr, all of Columbus, Ind.

[73] Assignee: Cummins Engine Company, Inc., Columbus, Ind.

[21] Appl. No.: 354,287

[22] Filed: Dec. 12, 1994

[51] Int. Cl.$^6$ .................. F15B 13/044; F16K 11/044
[52] U.S. Cl. ................ 137/625.65; 137/625.26; 137/625.27
[58] Field of Search .............. 137/625.27, 625.65, 137/625.26, 625.49

[56] References Cited

U.S. PATENT DOCUMENTS

| | | |
|---|---|---|
| 1,436,768 | 11/1922 | Mackie et al. . |
| 2,601,989 | 7/1952 | Modes . |
| 2,934,090 | 4/1960 | Kenann et al. ............. 137/625.27 X |
| 2,953,162 | 9/1960 | Ainsworth ..................... 137/625.12 |
| 2,964,023 | 12/1960 | Meulendyk ................... 137/625.12 |
| 3,016,917 | 1/1962 | Hunt . |
| 3,038,499 | 6/1962 | Dumm . |
| 3,151,624 | 10/1964 | Koutnik . |
| 3,587,156 | 6/1971 | Sorenson . |
| 3,689,782 | 9/1972 | Epszein . |
| 3,921,660 | 11/1975 | Kowalski . |
| 4,176,822 | 12/1979 | Chadwick . |
| 4,561,468 | 12/1985 | Kreitchman et al. . |
| 4,582,294 | 4/1986 | Fargo . |
| 4,598,736 | 7/1986 | Chorkey . |
| 4,726,493 | 2/1988 | Wallace et al. . |
| 4,932,439 | 6/1990 | McAuliffe, Jr. . |
| 5,038,826 | 8/1991 | Kabai et al. . |
| 5,396,926 | 3/1995 | Pataki et al. .................. 137/625.65 |

FOREIGN PATENT DOCUMENTS 64-69876  3/1989  Japan .

*Primary Examiner*—Gerald A. Michalsky
*Attorney, Agent, or Firm*—Woodard, Emhardt, Naughton, Moriarty & McNett

[57] ABSTRACT

A solenoid valve for use in a fuel system includes a valve body with a central core and three interconnected passageways. A spool is disposed within the central core and by means of enlarged and reduced diameter portions controls the flow through the solenoid valve. Solenoid armatures cooperatively control movement of the valve spool which is sized and shaped so as to provide a fuel flow path from an inlet passageway to an outlet passageway when the solenoid valve is in an opened condition. When the spool is shifted to a closed condition, incoming fuel is blocked and a flow path is created from the output passageway to a drain passageway. The drain passageway allows excess fuel in the injector to drain to relieve fuel pressure on the metering plunger. As the spool moves from a closed condition to an opened condition, some fuel flows to the drain passageway. The amount of fuel "loss" depends on the speed of the spool and the size of the drain passageway. In order to avoid the higher cost associated with drilling a small diameter hole through the valve body, a larger drilled hole is used. The enlarged end of the valve spool is extended so as to block a substantial portion of the drain passageway orifice. The blocked orifice yields a smaller flow through area and this reduced flow orifice area reduces transition loss and cavitation.

4 Claims, 4 Drawing Sheets

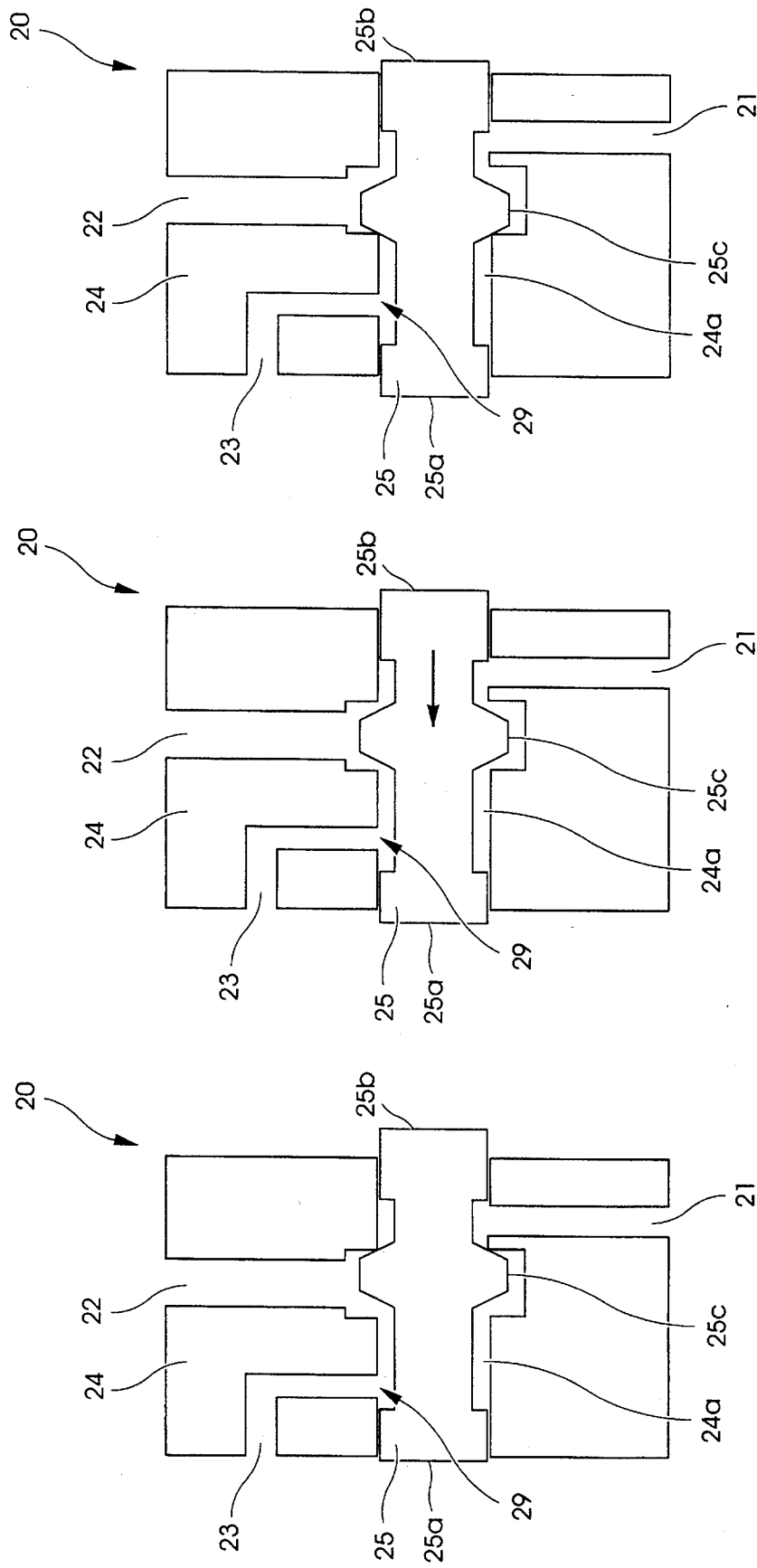

THREE-WAY FLOW VALVE WITH VARIABLE DRAIN ORIFICE AREA

BACKGROUND OF THE INVENTION

The present invention relates in general to valves which control the passage of fluid between two or more locations. More specifically the present invention relates to a three-way, solenoid valve which is used to control the flow of fluid between three locations in a fuel delivery system.

One means of controlling the precise delivery of a high pressure fluid is to use a solenoid valve where the armature of the solenoid either controls or is configured similar to the shape of a spool valve. Either one or two solenoids may be used to control movement of the spool valve between a valve-closed position and a valve-opened position. Typically the spool is configured with enlarged ends and an intermediate blocking portion with reduced diameter portions between each end and the intermediate blocking portion. The ends of the spool valve may be utilized as part of the sealing within the valve housing. The reduced diameter portions between the enlarged ends and the intermediate blocking portion provide for the flow of fluid over and around the spool valve. In the valve-opened condition, a flow path is established for pressurized fluid to enter through an inlet passageway and exit through an outlet passageway. The speed of the solenoid armature and thus the speed of the spool valve moving from a closed to an opened which is delivered and the preciseness of the opening and closing times.

When a solenoid valve of the type described is used in conjunction with a fuel injector, for example, there will be a need to permit the backflow of fuel to an open drain port in the solenoid valve which will return this fuel to the fuel tank or other fuel reservoir. By allowing some of the fuel to drain from the injector, this relieves the fluid pressure on the metering plunger of the injector. By relieving this fluid pressure the metering plunger is allowed to return to its normal position for the start of another injection cycle.

A typical solenoid valve for this application would include an inlet port or aperture, an outlet port, and a separate drain port, all fabricated into a valve housing and internally flow coupled. Typically these three ports or passageways are arranged to intersect a common central core opening extending through the valve housing. This central core which is generally cylindrical is constructed and arranged to receive the spool valve. In the opened condition, pressurized fuel is able to travel from the inlet to the outlet over and around the spool valve. In this configuration, the drain passageway is closed. After the charge of fuel has been delivered, the solenoid valve shifts to its closed condition which prevents the introduction of any more pressurized fuel through the inlet port. In the closed condition, flow communication between the outlet port and the drain port is permitted and this allows the fuel in the injector to drain back so as to prepare the injector for the next charge of fuel which it will receive.

In this typical type of solenoid valve there are two current concerns which could constitute significant problems depending on their extent or magnitude. The first concern relates to a transition loss which can occur during movement of the spool valve between its closed and opened conditions. When the spool valve moves from a closed condition to an opened condition there is an opportunity for a small amount of the entering high pressure fluid to escape to the drain port rather than all of the entering fluid going to the outlet port. Thus, during the "transition" of the spool valve from a closed to opened condition, there is some fluid "loss" to the drain.

The second concern relates to cavitation which is caused in part by the speed of the spool valve as it moves through the valve body. Transition loss and cavitation significantly affect system performance and affect the development of high performance solenoid valves. It is therefore important to design a three-way solenoid valve such that transition loss and cavitation are reduced.

It is known that the larger the drain orifice area, the more significant the transition loss and cavitation for a given spool valve speed. If the sole issue is the diameter size of the drain orifice relative to the opening speed of the solenoid valve, a smaller drain orifice could be considered. Experimental work with different orifice sizes for the drain passageway has confirmed that a smaller drain orifice does improve valve performance. This experimental work compared a drain orifice with a diameter size of 0.06 inches (1.52 mm) as compared to a drain orifice diameter size of 0.04 inches (1.02 mm). A second concern then becomes the draining duration from the injector as the length of the draining duration is directly proportional to the reciprocal of the drain orifice diameter. It has been determined that the end of the draining duration can be allowed to go up to 720 degrees of crank angle after fuel injection. This indicates that significantly smaller drain orifice diameters can be used, such as diameters in the 0.01 inch (0.25 mm) to 0.02 inch (0.51 mm) range.

While this "theory" is analytically sound, there are other manufacturing realities to consider, such as the cost of the solenoid valve if a drilled drain passageway in the 0.01 inch (0.25 mm) diameter range is required. A larger drain orifice would certainly reduce the valve cost, but this would bring back into play the associated concerns of cavitation and transition loss. Therefore, a solution that balances these competing interests is needed.

The present invention provides a unique and obvious solution to this problem by creating a variable drain orifice which is based on a larger drilled bore for the drain passageway and orifice but which uses the spool geometry to reduce cavitation and transition loss.

Over the years, a variety of solenoid valve designs have been contemplated, several of which have become the subject of patent applications and issued patents. Below is a listing of six issued United States patents which are believed to provide a representative sampling of these earlier designs. Also listed is a pending U.S. patent application which discloses a three-way valve having various flow channels formed between the valve member and the valve housing.

| U.S. Pat. No. /Ser. No. | INVENTOR | ISSUE DATE |
| --- | --- | --- |
| 3,587,156 | Sorenson | Jun. 28, 1971 |
| 3,921,660 | Kowalski | Nov. 25, 1975 |
| 4,582,294 | Fargo | Apr. 15, 1986 |
| 4,598,736 | Chorkey | Jul. 8, 1986 |
| 4,726,493 | Wallace et al. | Feb. 23, 1988 |
| 4,932,439 | McAuliffe, Jr. | June 12, 1990 |
| 5,396,926 | Pataki, et al. | Mar. 14, 1995 |

SUMMARY OF THE INVENTION

A solenoid valve for use in a pressurized fluid delivery system according to one embodiment of the present invention comprises a valve body defining therein three interconnected flow passageways wherein a first passageway is used for fluid input, a second passageway is used for fluid output to a primary location, and a third passageway is used for fluid output to a secondary location. A movable valve spool is disposed within the valve body and is axially movable between a valve-closed position and a valve-opened position, the movable valve spool being constructed and arranged such that the second and third passageways are in flow communication with each other when the movable valve spool is in the valve-closed position, and the first and second passageways are in flow communication with each other when the movable valve spool is in the valve-opened position, and the movable valve spool having an elongated blocking end arranged relative to the third passageway so as to reduce the flow through orifice area of the third passageway when the movable valve spool is in the valve-closed position.

One object of the present invention is to provide an improved three-way solenoid valve for a fuel delivery system.

Related objects and advantages of the present invention will be apparent from the following description.

BRIEF DESCRIPTION OF THE DRAWINGS

FIG. 1A is a diagrammatic side elevational view in full section of a prior art solenoid valve in a valve-closed condition.

FIG. 1B is a diagrammatic, side elevational view in full section of the FIG. 1A solenoid valve with the valve spool moving from a closed to an opened condition.

FIG. 1C is a diagrammatic, side elevational view in full section of the FIG. 1A solenoid valve in an opened condition.

DESCRIPTION OF THE PREFERRED EMBODIMENT

Figure 2C:
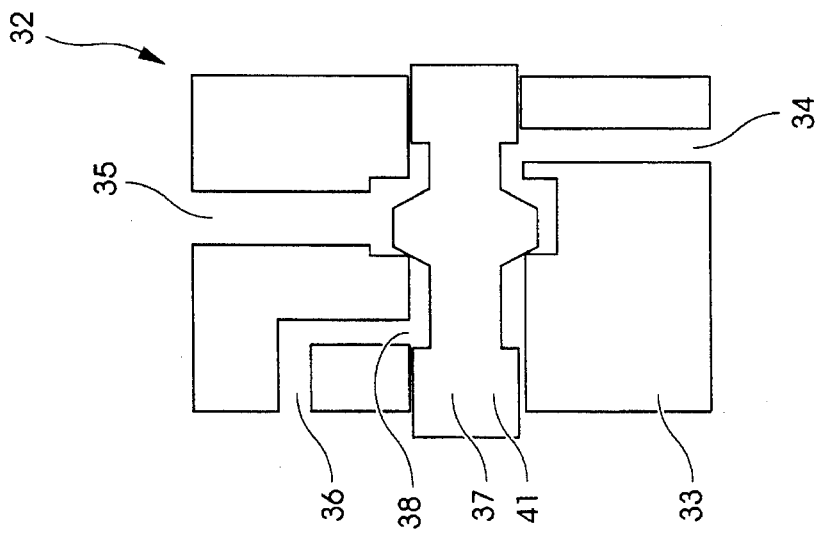
FIG. 2C is a diagrammatic, side elevational view in full section of the FIG. 2A solenoid valve in an opened condition.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIGS. 1A, 1B, and 1C, there is diagrammatically illustrated a three-way solenoid valve 20 which is configured in a conventional manner, and which is representative of the prior art. The three-way designation comes from the fact that there are three passageways 21, 22, and 23 created within the valve body 24, each of which are in flow communication with a central core volume 24a. Spool 25 is directly connected at each end to a corresponding solenoid armature, The movement of the armatures controls the movement and positioning of the spool as well as the speed at which the spool moves from a valve-closed condition (FIG. 1A) to a valve-opened condition (FIG. 1C).

Passageway 21 represents the input path of the entering fluid. In the preferred embodiment, the fluid is pressurized fuel. Passageway 22 represents the output path from the valve body 24 for the entering fluid. In the preferred embodiment, the exiting fluid (fuel) flows to a fuel injector. The solenoid valve 20 may be integrated in its construction with the fuel injector or may be separated from the injector. Passageway 23 represents a drain path in order for the fuel returning (draining) from the injector to be returned to the fuel supply or other fuel reservoir. The geometry of the valve spool 25 relative to the configurations of the valve body 24 and central core 24a results in the desired flow path from the input path to the output path and from the output path back to the drain path.

In operation a pressurized actuating fluid (fuel) is either introduced into passageway 21 (FIG. 1A) or is present in passageway 21 while the solenoid valve is held closed by the position of the solenoid armatures. In this condition, the output passageway and drain passageway are in open communication with each other. There is though no open flow path between passageway 21 and passsageway 22. When there is a desire or command to deliver a charge of fuel to the fuel injector, the solenoid is actuated and the valve spool 25 moves rapidly to the left. The configuration of spool 25 is such that it will abut up against an interior portion of the valve body 24 so as to close off the drain passageway 23 from the output passageway 22 and open a path from the input passageway 21 to the output passageway 22.

The valve spool 25 is configured with two enlarged ends 25a and 25b and an enlarged intermediate blocking portion 25c. The areas on either side of the intermediate blocking portion 25c are of a reduced diameter and are the areas which enable flow around the valve spool from one passageway to another. The movement of spool 25 is diagrammatically illustrated in FIG. 1B and the valve-opened condition is diagrammatically illustrated in FIG. 1C.

As should be clear, as the spool 25 moves from a closed condition to an opened condition, it is possible for some portion of the pressurized actuating fluid to flow from the input passageway 21 to the drain passageway 23. This flow is considered to be a transition loss and the magnitude of this loss is determined by the speed of spool 25 and the size of the drain orifice 29 of the drain passageway 23. When the spool returns to the valve-closed condition of FIG. 1A, sealing the input passageway, there is a flow path created for the backflow of fuel from the injector. The duration of the draining phase from the injector to the drain needs to be such that the injector is drained of any excess fuel and then made ready for the next charge of fuel to be delivered. As mentioned in the background discussion, draining some of the fuel from the injector relieves the fluid pressure on the metering plunger of the injector and allows the plunger to return to its normal position as would be required for the start of another injection cycle.

The length of the draining duration is proportional to the reciprocal of the drain orifice 29 diameter. Therefore, a larger drain orifice will reduce the draining duration. However, with a larger drain orifice area, significant cavitation can occur and this adversely affects valve performance. In order to reduce transition loss and cavitation, experiments have been run comparing various effects on performance as the size of the drain passageway and drain orifice are reduced. It has been found that fairly small diameter sizes in the range of 0.01 inches (0.25 mm) to 0.02 inches (0.51 mm) can be used and still provide sufficient draining capacity and a short enough duration for the injector to be drained and readied in time to receive the next charge of fuel. The drawback with reducing the diameter of the drain passageway and orifice to this somewhat minute size range is the corresponding cost of the solenoid valve. The required machining setup and the time to accurately position and hold a fairly long drilled passageway of this small diameter size adds significantly to the cost of the solenoid valve. The present invention addresses the problems of cavitation, transition loss, and higher cost with a compromise design that solves these problems in a unique and unobvious way.

Figure 2B:
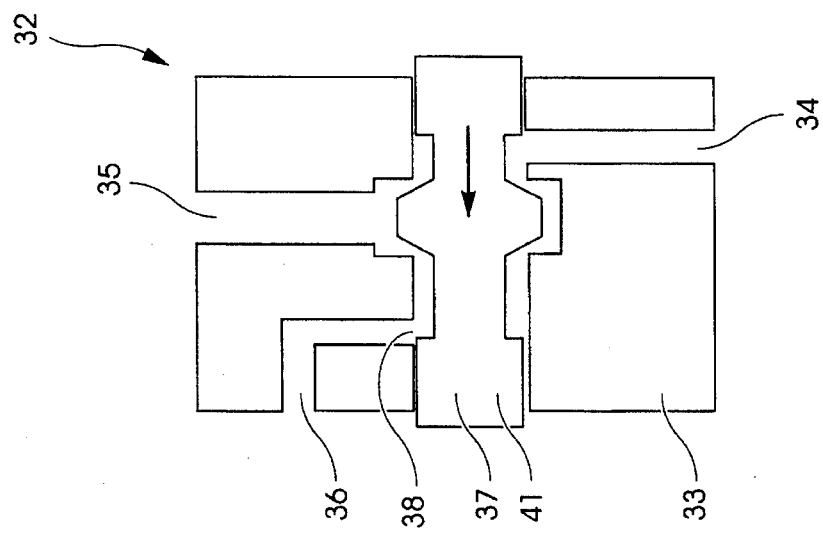
FIG. 2B is a diagrammatic, side elevational view in full section of the FIG. 2A solenoid valve with the valve spool moving from a closed to an opened condition.
Figure 2A:
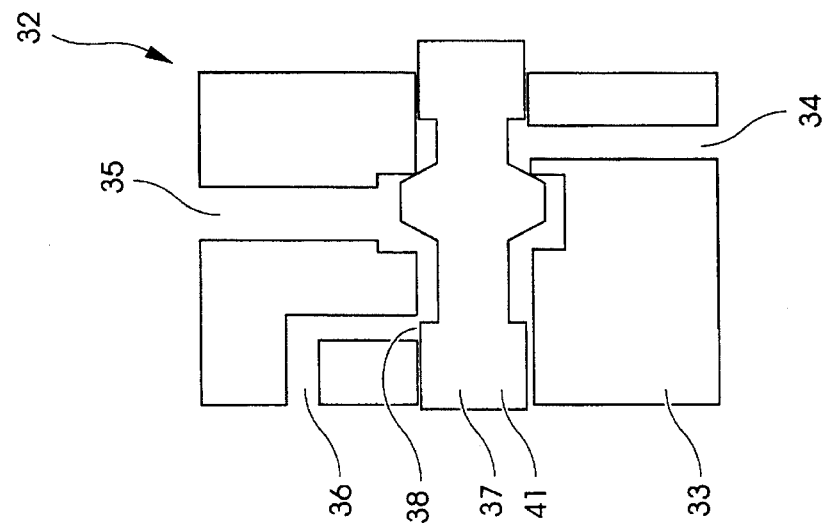
FIG. 2A is a diagrammatic, side elevational view in full section of a three-way solenoid valve in a closed condition according to a typical embodiment of the present invention.
Figure 3:
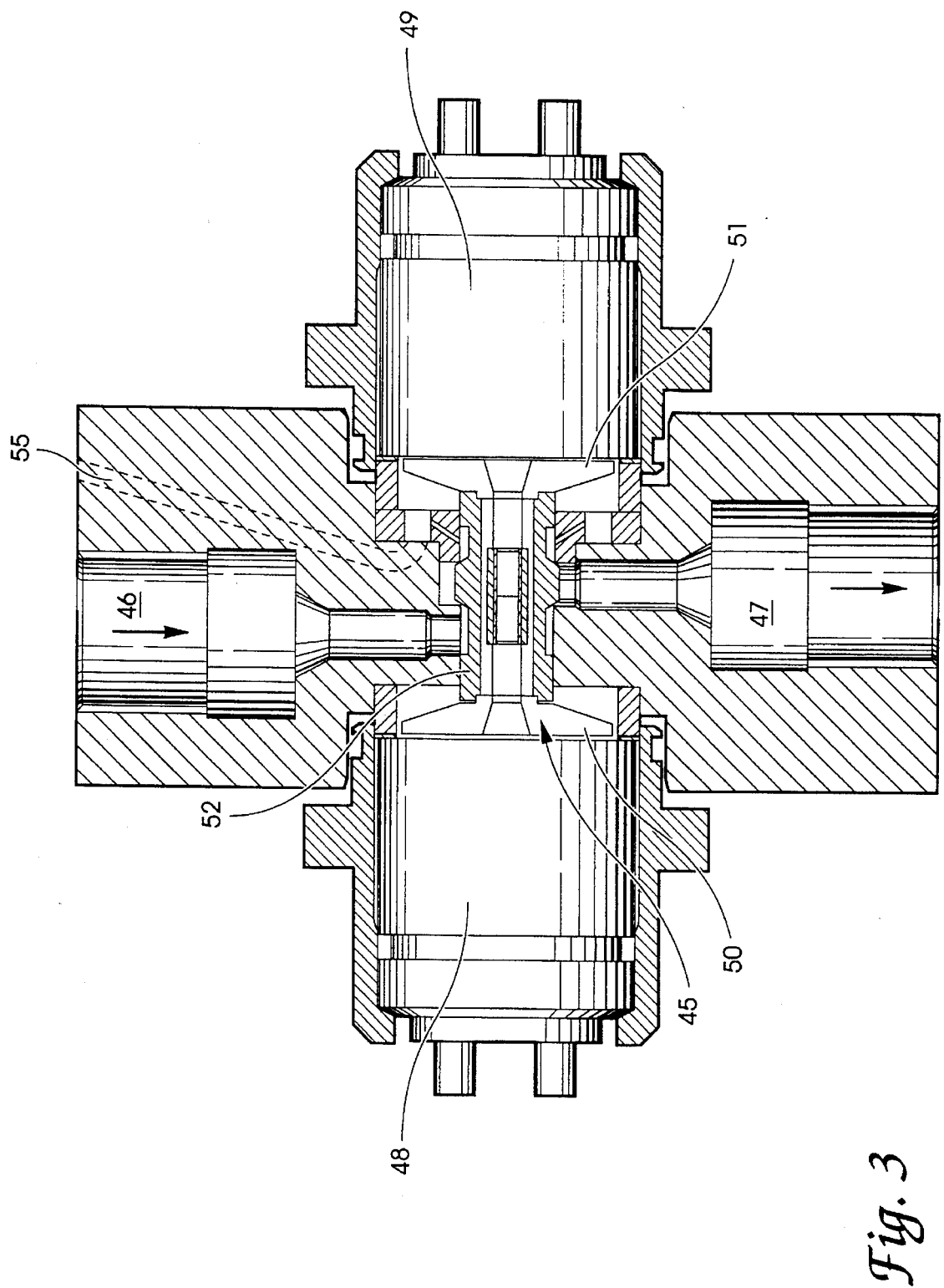
FIG. 3 is a side elevational view in full section of a three-way solenoid valve according to the present invention as arranged with a pair of controlling solenoids.

Referring now to FIGS. 2A, 2B, and 2C, a three-way solenoid valve 32 according to the present invention is diagrammatically illustrated. The valve body 33 is very similar in size, shape, and arrangement to the prior art valve body 24 of FIGS. 1A, 1B, and 1C. Likewise, flow passageways 34, 35, and 36 are of a similar size, shape and location to passageways 21, 22, and 23. Passageway 34 represents the flow input, passageway 35 represents the flow output to the injector, and passageway 36 represents the drain path. Spool 37 still moves right to left for opening the solenoid valve 32 and left to right for closing. As is illustrated in FIG. 3, the valve spool 37 of the present invention is controlled by a pair of oppositely disposed solenoids with their corresponding armatures acting upon opposite ends of spool 37. In a manner similar to what was described with regard to the prior art configuration of FIGS. 1A, 1B, and 1C, spool 37 has a pair of enlarged ends, an enlarged intermediate or center portion, and two reduced diameter areas on either side of the intermediate center portion. These reduced diameter areas enable the flow across and around the valve spool 37.

The primary focus of the present invention is to create a variable flow area drain orifice 38. To the extent that the drain passageway through the valve body is a drilled hole, the flow area of the drain orifice 38 will be the same as the flow area of the drain passageway. However, the variable flow area which is provided by the present invention focuses only on the drain orifice and a reduction in the size of that orifice by partially blocking it with one end of the valve spool. In the preferred embodiment this is accomplished by reshaping the valve spool 37 so as to axially extend or elongate end 41 so as to partially block the drain orifice 38 when the solenoid valve is in its valve-closed condition as illustrated in FIG. 2A. The left end 41 of spool 37 which already has an increased diameter size has been lengthened axially or longitudinally over what would be thought of as a typical or traditional spool as illustrated in FIGS. 1A, 1B, and 1C. By lengthening enlarged spool end 41, a substantial portion of the drain orifice flow area is blocked. In the preferred embodiment, approximately 80% of the drain orifice area is blocked by spool end 41. This allows the use of a drill with a diameter size of 0.10 inches (2.54 mm) for the drain passageway and drain orifice. By blocking roughly 80% of this orifice flow area, the resulting flow area available for draining fuel from the injector would be a sector-shaped area corresponding to an opening of approximately 0.02 inches (0.51 mm) in diameter. While the foregoing mathematics may prove the point as to the area reduction, it is also to be understood that the corresponding geometries of the circular drain orifice and the cylindrical blocking end 41 will actually result in a sector slice of the drain orifice being left open and thus not a true diameter flow area. However, the point is that the end 41 can be modified (extended) so as to block a substantial portion of the drain orifice and achieve the desired results of reduced transition loss and reduced cavitation without any noticeable increase in the cost of the valve.

As spool 37 moves to the left or in the valve-opening phase (FIG. 2B), the full orifice area will not be immediately opened and accessible to the incoming fuel as was true with the prior art arrangement of FIG. 1B. By reducing the area of the drain orifice which sees the incoming fuel, the transition loss is reduced and the cavitation effects are reduced. In the closed condition (FIG. 2A) the reduced area orifice is still large enough for completing the draining phrase from the injector before the next charge of fuel is delivered to the injector.

By using a larger drain passageway and orifices compared to an orifice of 0.01 inches (0.25 mm) to 0.02 inches (0.51 mm) in diameter, the cost of the solenoid valve is less while still providing an improved design. The only added cost with the present invention is the cost of more material on the end of the spool which is essentially negligible. By being able to use larger drill sizes for the drain passageway, the machining costs are able to be controlled and kept within reason for a lower cost solenoid valve.

Figure 4:
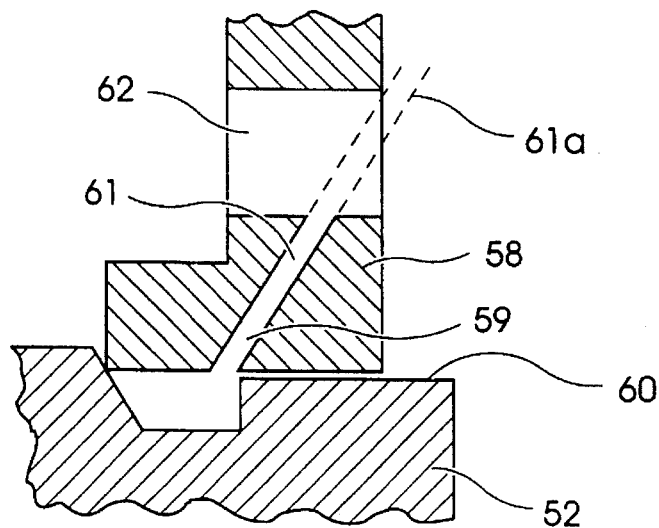
FIG. 4 is an enlarged detail, side elevational view in full section of the valve spool of the FIG. 3 arrangement relative to the drain orifice when the solenoid valve is in a closed condition.
Figure 5:
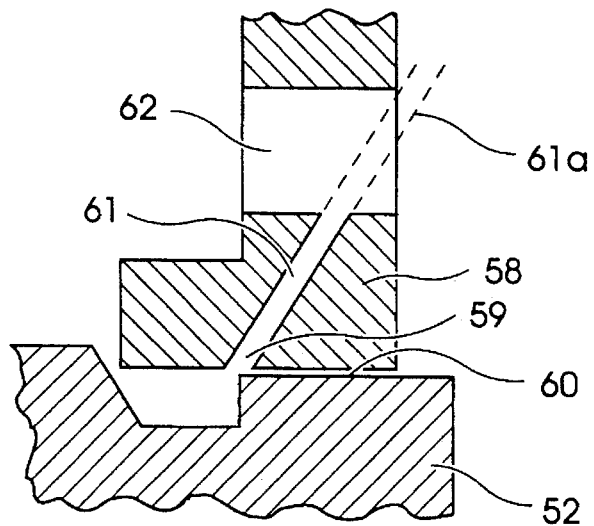
FIG. 5 is an enlarged detail, side elevational view in full section of the valve spool of the FIG. 3 arrangement relative to the drain orifice when the solenoid valve is in its opened condition.

Referring to FIG. 3 there is illustrated a solenoid valve 45 according to the present invention. Valve 45 is intended to provide a more realistic configuration of what was only diagrammatically illustrated in FIGS. 2A, 2B, and 2C. The three FIG. 2 views yield a very clear and demonstrative example of the present invention in a manner similar to how the prior art was illustrated in FIG. 1. However, the actual arrangement as depicted in FIG. 3 shows the fuel-in path 46, fuel-out path 47, two opposing solenoid coils 48 and 49, two armatures 50 and 51, and spool 52. As illustrated, spool 52 is positioned between the two solenoid armatures and across the input to output fluid flow path. Drain passageway 55 is illustrated by a broken line representation. This is the primary drain path leading from the solenoid valve though there are two other drain path portions which are illustrated in FIGS. 4 and 5 and which are the focus of the present invention. As will be noted from the FIG. 3 illustration, the valve spool 52 has two oppositely disposed enlarged ends and an intermediate or center portion also of an enlarged diameter. On either side of the enlarged diameter center portion of the spool are reduced diameter portions in order to provide the fuel flow in and around the valve spool.

The specific geometry of spool 52 relative to the valve body 58 and drain orifice 59 when in a valve-closed condition is illustrated in FIG. 4. As illustrated, the drain orifice 59 is partially closed by spool end 60. The small flow area which is left is seen as a small area drain orifice by the overall solenoid valve system resulting in reduced transition loss and cavitation but without the corresponding higher cost of drilling a small diameter orifice. These same components, when in a valve-opened condition, are illustrated in FIG. 5. With regard to both FIGS. 4 and 5, it is to be noted that the drain orifice 59 is at the lower open end of a drilled passageway 61 and the drill path is illustrated by broken lines 61a. Open region 62 provides a flow communication path from drain passageway 61 to drain passageway 55.

Movement of valve spool 52 to the left closes the drain orifice off from the incoming fuel flow. A return of spool 52 to the FIG. 4 condition allows the fuel to drain from the injector and to do so fast enough to have the injector ready for the next charge of fuel. As illustrated in FIGS. 4 and 5, the spool end 60 has been provided with an elongated configuration so that a portion of this spool end extends across a substantial portion of the drain orifice 59. Although the geometric shape of the valve spool relative to the cylindrical or circular shape of the drain orifice leaves an open sector area for fuel drainage, this sector shape can be controlled by controlling the axial length of spool end 60 so as to leave a drain orifice area which is just large enough in flow area to drain the injector in time for the next charge of fuel. By reducing the flow area of the drain orifice to the minimum size necessary for the draining cycle, there is less area for fuel to flow into as the solenoid valve is opened-with less area for fuel to flow into from the flow input to the drain, there will be less transition loss and reduced cavitation.

Another feature of the present invention is the angled drill direction which creates drain passageway 61 and drain orifice 59. The angled drill direction defines an acute included angle relative to the direction of movement of the valve spool. While the angled direction of drilling is necessary in order to have the desired drill clearance, it also creates an elliptical drain orifice area. The major axis of the ellipse runs parallel ho the movement direction of the valve spool and enables greater design freedom in the sizing and positioning of the enlarged spool end 60 so as to achieve the precise reduced flow area for the drain orifice which is desired.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A solenoid valve assembly for use in a pressurized fluid delivery system, said solenoid valve assembly comprising:

a valve body defining therein three interconnected flow passageways wherein a first passageway is used for fluid input, a second passageway is used for fluid output to a primary location, and a third passageway is used for fluid output to a secondary location;

a movable valve spool disposed within said valve body and extending axially therethrough and being axially movable between a valve-closed position and a valve-opened position, said movable valve spool being constructed and arranged such that said second and third passageways are in flow communication with each other when said movable valve spool is in said valve-closed position and said first and second passageways are in flow communication with each other when said movable valve spool is in said valve-open position; and said movable valve spool having an elongated blocking end arranged relative to said third passageway so as to reduce the flow through orifice area of said third passageway when said movable valve spool is in said valve-closed position, wherein said elongated blocking end reduces the flow through orifice area of said third passageway by at least 75 percent.

2. The solenoid valve assembly of claim 1 wherein said third passageway is drilled at an acute included angle relative to the direction of movement of said valve spool.

3. A three-way solenoid valve assembly for use in a fuel delivery system, said solenoid valve assembly comprising:

a valve body defining a central core and first, second, and third passageways which are arranged in flow communication with said central core;

a valve spool disposed in said central core and movable between a valve-closed position wherein said second and third flow passageways are in flow communication with each other and a valve-opened position wherein said first and second flow passageways are in flow communication with each other; and said third passageway having an inlet orifice and said valve spool including a flow restrictor portion disposed adjacent to said inlet orifice for reducing the flow area of said inlet orifice when said valve spool is in said valve-closed position, wherein said flow restrictor portion reduces the flow through said inlet orifice of said third passageway by at least 75 percent.

4. The solenoid valve assembly of claim 3 wherein said third passageway is drilled at an acute included angle relative to the direction of movement of said valve spool.

* * * * *

UNITED STATES PATENT AND TRADEMARK OFFICE
CERTIFICATE OF CORRECTION

PATENT NO. : 5,518,030

DATED : May 21, 1996

INVENTOR(S) : Chung Y. Liu, et al.

It is certified that error appears in the above-identified patent and that said Letters Patent is hereby corrected as shown below:

In column 1, at line 28, insert the following after "opened", --position determines the preciseness of the fluid flow volume--.

In column 4, at line 11, replace the "," after "armature" with --.--.

In column 7, at line 28, replace "ho" with --to--.

Signed and Sealed this

Twenty-fourth Day of September, 1996

Attest:

BRUCE LEHMAN

*Attesting Officer*   *Commissioner of Patents and Trademarks*